United States Patent [19]

Griffin

[11] 4,370,604
[45] Jan. 25, 1983

[54] SOLENOID ACTUATED SERVO SYSTEM

[75] Inventor: Patrick J. Griffin, Annapolis, Md.

[73] Assignee: Honeywell Inc., Minneapolis, Minn.

[21] Appl. No.: 277,561

[22] Filed: Jun. 25, 1981

[51] Int. Cl.³ .......................................... G05B 11/00
[52] U.S. Cl. .................................. 318/687; 318/663; 361/152
[58] Field of Search ............... 318/663, 687, 38, 135, 318/657; 307/38; 361/152, 191

[56] References Cited

U.S. PATENT DOCUMENTS

| | | | |
|---|---|---|---|
| 3,019,374 | 1/1962 | Ladd, Jr. | 361/152 |
| 3,432,678 | 3/1969 | Larson | 307/38 |
| 3,549,966 | 12/1970 | Wilson | 318/135 |
| 3,736,473 | 5/1973 | Pugh | 361/152 |
| 3,737,883 | 6/1973 | Sordello | 318/687 X |
| 4,291,258 | 9/1981 | Clark et al. | 318/687 |

Primary Examiner—B. Dobeck
Attorney, Agent, or Firm—Charles L. Rubow

[57] ABSTRACT

A proportional solenoid actuated servo system and associated drive circuitry are disclosed in which a pair of oppositely acting coils of the solenoid are connected in series across a floating power supply with the center point between the coils grounded. The voltages produced at the power supply terminals are differentially controlled relative to ground by voltage control means which responds to position command and armature position feedback signals. The force exerted by the armature is controlled by a power control signal which varies the voltage difference between power supply terminals.

10 Claims, 1 Drawing Figure

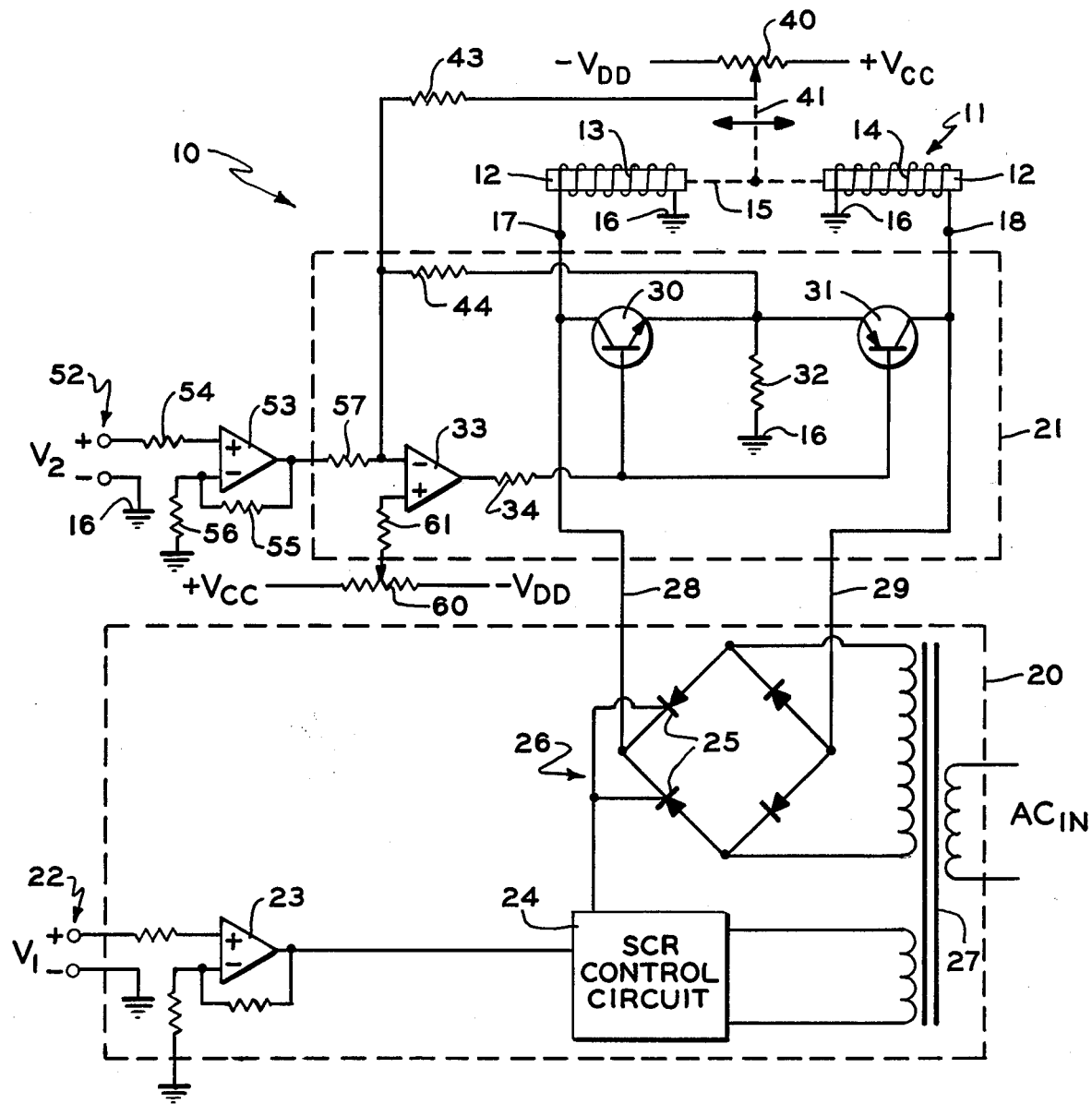

SOLENOID ACTUATED SERVO SYSTEM

BACKGROUND OF THE INVENTION

The invention disclosed herein relates generally to solenoid actuated systems, and more particularly to a servo system employing a proportional solenoid actuator and associated closed loop drive circuitry.

Solenoid actuators are characterized by a number of features which make them attractive for many applications requiring conversion of electrical energy to linear mechanical motion. Such actuators are inherently simple and rugged. Since they convert electrical energy directly to linear motion, a minimum number of moving parts are required. Further, relatively high forces may be obtained from a device of small physical size and power requirements, particularly at the energized end of its stroke.

Nevertheless, although proportional solenoids are known as shown in U.S. Pat. No. 3,154,729 issued to B. Duff on Oct. 27, 1964, solenoid actuators have not been commonly used in applications requiring proportional position control. One reason is that conventional solenoid actuators inherently do not produce a uniform force throughout the stroke distance. Accordingly, for anything approaching reasonably constant force operation, the drive current must be varied with armature position. Even then, with conventional drive circuitry it is difficult to achieve an acceptably uniform force throughout the length of the stroke.

Various schemes have been devised for modifying the force versus travel relationship in solenoid mechanisms. U.S. Pat. No. 1,754,069 issued to H. Trencham et al on Apr. 8, 1930 discloses a solenoid operated mechanism which utilizes two solenoids interconnected by a floating lever and working in unison to tailor the force and motion produced by the mechanism. The solenoids are operated in a predetermined sequence by a system of switches in which a switch for one solenoid may be controlled by the other solenoid. Although such a mechanism is capable of varying the normal operating characteristics of a solenoid actuated mechanism, the mechanization is somewhat cumbersome, and does not avoid the abrupt motions of conventional solenoid mechanisms.

Also, most common types of solenoids use magnetic attraction for armature movement in one direction only. A spring is typically employed to return the armature when the solenoid is not energized. Such designs, which include only a single electrical energization coil, are characterized by actuation forces which are different for different directions of armature travel.

Exceptions to this mode of operation are found in previously identified U.S. Pat. Nos. 3,154,729 and 3,766,432 issued to I. Markowitz et al on Oct. 16, 1963. However, no drive circuitry is described in the first of these patents, so that it cannot be ascertained how the disclosed solenoid should be energized. More particularly, the patent contains no suggestion of closed loop operation. The second of these patents discloses a bi-directional solenoid actuator with a pair of coils which produce oppositely directed forces on the solenoid armature to achieve rapid repositioning thereof, and holding of the armature in its desired position without the necessity of a high holding current for keeping the armature in place against a spring bias. Drive circuitry is disclosed which initially provides a relatively high switching current, and after the armature is seated, reduces the current to a relatively low holding value. The features of this drive circuitry are not, however, applicable to proportional positioning.

Other forms of drive circuitry for solenoid systems are shown in U.S. Pat. Nos. 3,289,191 issued to R. Schauer on Nov. 29, 1966 and 4,059,844 issued to J. Stewart on Nov. 22, 1977. These patents basically disclose solenoid drive circuitry schemes in which opposing polarity current drivers are utilized to energize a selected one of two or more solenoids, and to limit solenoid power requirements.

In part because of the foregoing characteristics of solenoid actuators, other types of actuators, such as stepper motors, rotary servo motors and motors with synchro shaft angle transmitters, have normally been used where proportional position control is needed. Typical systems of these types are disclosed in U.S. Pat. Nos. 2,549,829 issued to E. Lilja on April 24, 1951 and 3,510,739 issued to B. Peterson on May 5, 1970. Such actuators are inherently more complicated and expensive than solenoid actuators. Since there are many proportional position control applications in which solenoid actuators are potentially suitable, it would be desirable to provide a solenoid actuator and drive system for enhancing proportional solenoid operation and, for optimizing solenoid servo system performance.

The applicant has devised means for extending the applications in which a solenoid actuated mechanism is useful, while retaining the advantageous characteristics of such mechanisms, by employing close loop drive circuitry which provides servo operation. Armature position and force are independently controlled by input signals of a form which may be easily programmed to the characteristics of a particular solenoid actuator and to the operating parameters desired for a particular application.

SUMMARY OF THE INVENTION

The present invention is a solenoid actuated servo system which employs solenoid actuator means having first and second opposingly acting coils connected in series, with the center point connected to a reference potential source. A floating power supply is connected across the coils. Voltage control means which responds to a position command input signal and an armature position feedback signal differentially shifts the voltages provided by the power supply about the reference potential so as to control armature position. The magnitude of the difference in voltages provided by the power supply means may be varied by a power control signal, whereby the sum of the currents in the solenoid coils is controlled so as to control the force produced by the armature.

BRIEF DESCRIPTION OF THE DRAWING

The single FIGURE of the drawing is a schematic diagram of a solenoid actuator and drive circuitry in accordance with the applicant's invention.

DESCRIPTION OF THE PREFERRED EMBODIMENT

Reference numeral 10 in the FIGURE generally identifies a servo actuator and drive circuitry system which includes bi-directional solenoid actuator means generally identified by reference numeral 11. Actuator means 11 is shown with movable armature means 12 formed and located so as to be subjected to magnetic forces provided by first and second coils 13 and 14. Armature means 12 is illustrated as a pair of armatures which are mechanically interconnected as shown by dashed line 15. However, armature means 12 could equally well be a single armature subject to the influence of coils 13 and 14.

One end of each of coils 13 and 14 is connected to a source of reference potential 16 which is illustrated as electrical ground. The other end of coil 13 is connected to one output terminal 17 of position control means through which is supplied electrical current suitable for energizing the coil. Similarly, the other end of coil 14 is connected to a second output terminal 18 of the position control means through which is supplied suitable electrical energization current.

The position control means comprises power supply means generally identified by reference numeral 20 and regulating means which will be described hereinafter. Power supply means 20 is a bi-polar voltage source which produces voltages at a predetermined voltage difference between output terminals 17 and 18. Except for the action of the regulating means, the voltages produced at terminals 17 and 18 would float with respect to the potential of reference potential source 16. The difference in voltages produced by power supply means 20 is determined by a power control signal $V_1$ supplied to input terminal means 22. Signal $V_1$ is supplied to an operational amplifier 23 having suitable biasing and feedback networks. The output signal of amplifier 23 is supplied to an SCR control circuit 24 which controls a pair of SCRs 25 in a full wave bridge generally identified by reference numeral 26. Control circuit 24 and bridge 26 are energized from secondary windings of a transformer 27 whose primary winding is connected to an AC power source.

The design, construction and operation of power supplies such as power supply means 20 are discussed in detail "DC Power Supply Handbook—Application Note 90B," Hewlett-Packard Company, pages 7-11 (1978) to which reference may be made for a more complete description. However, for purposes of appreciating the features of the present invention it should be reemphasized that the voltage difference between the output terminals of power supply means 20 is controlled simply by power control signal $V_1$. This signal may be supplied from any suitable source, including a computer through suitable interface circuitry, and may be programmed to the characteristics of a particular solenoid actuator mechanism and to a wide range of operational requirements.

The voltages provided at output terminals 17 and 18 are shifted or differentially controlled relative to the reference potential by voltage control means 21. Voltage control means 21 includes regulating means comprising a pair of complementary transistors 30 and 31 connected in series in a push-pull configuration between conductors 28 and 29. As shown, conductors 28 and 29 connect power supply 20 to output terminals 17 and 18 respectively.

The collectors of transistors 30 and 31 are connected to conductors 28 and 29 respectively. The emitters of the transistors are connected to each other and to the reference potential source or ground 16 through a resistor 32. The bases of transistors 30 and 31 are connected to receive control signals from an operational amplifier 33 through a resistor 34.

The inverting input terminal of amplifier 33 functions as a summing point for a position feedback signal and a signal indicative of the commanded position of armature means 12. The position feedback signal is obtained from a potentiometer 40 connected across a bi-polar voltage source $+V_{cc}/-V_{dd}$. The wiper of potentiometer 40 is mechanically connected to armature means 12 as indicated by dashed line 41 so that the wiper is positioned in accordance with the position of the armature means. The voltage on the wiper of potentiometer 40 is supplied through a voltage divider network comprising resistors 43 and 44 to the inverting input terminal of amplifier 33 as the position feedback signal.

The position command signal $V_2$ is supplied to input terminal means 52 of position command input means which includes an operational amplifier 53. Position command signal $V_2$ is shown as being applied between reference potential source or ground 16 and a resistor 54 connected to the noninverting input terminal of amplifier 53. A feedback network in the form of a voltage divider comprising resistors 55 and 56 between the output terminal of amplifier 53 and ground is connected to the inverting input terminal of amplifier 53. The output terminal of amplifier 53 is connected to the summing point at the inverting input terminal of amplifier 33 through a resistor 57. Accordingly, signals derived from the actual and commanded positions of armature means 12 are combined, and amplifier 33 supplies a corresponding position control voltage to the bases of transistors 30 and 31 so as to differentially control the voltages at terminals 17 and 18.

The non-inverting input terminal of amplifier 33 is connected to the wiper of a potentiometer 60 which is connected across bi-polar voltage source $+V_{cc}/-V_{dd}$ through a resistor 61. Potentiometer 60 provides a means for setting a reference voltage for amplifier 33, and thus controls the neutral position of armature means 12.

The mechanization and operating principles of regulating means 21 are set forth in detail in previously identified "DC Power Supply Handbook," pages 27-29. As indicated in this reference, and as can be seen from the circuitry shown and described herein, position command signal $V_2$ can be supplied by any suitable source, including a computer, and can be programmed for a wide range of solenoid actuator applications.

In accordance with the foregoing description, the applicant has provided unique solenoid actuated servo system means including drive circuitry which permits independent variations in position and force applied by the solenoid armature. The position and force control input signals may be easily generated and programmed to accommodate a particular solenoid actuator and a wide range of solenoid actuator applications. The drive circuitry is of a unique simple design and the system retains the desirable characteristics of simplicity and ruggedness inherent in conventional solenoid actuators, while providing for smooth proportional movement.

Although a particular embodiment has been shown and described for illustrative purposes, a number of variations and modifications will be apparent to those familiar with the relevant arts. It is intended that coverage of the invention not be limited to the embodiment shown, but only by the terms of the following claims.

The embodiments of the invention in which an exclusive property or right is claimed are defined as follows:

1. A solenoid actuated servo system comprising:
    solenoid actuator means having armature means and first and second coils, energization of which respectively tends to move the armature means in opposite directions;

position control means having an input terminal for receiving a position control voltage and first and second output terminals for supplying electric currents suitable for energizing the coils of said solenoid actuator means, the currents varying differentially in response to variations in the position control voltage;

means connecting the first and second output terminals of said position control means to the first and second coils respectively of said solenoid actuator means;

feedback means for generating a feedback voltage indicative of the position of the armature means of said solenoid actuator means;

position command input means for receiving a position command signal and supplying a corresponding position command voltage; and combining means connected to receive and combine the feedback voltage and the position command voltage to produce the position control voltage, and to supply the position control voltage to said position control means.

2. The servo system of claim 1 wherein said position control means comprises:

a source of reference potential;

a bipolar voltage source having a pair of output terminals at which are supplied first and second voltages at a predetermined voltage difference and of opposite polarities relative to the reference potential, the terminals of said voltage source comprising the first and second output terminals of said position control means; and regulating means for shifting the first and second voltages relative to the reference potential in response to the position control voltage while maintaining the predetermined voltage difference between the first and second voltages.

3. The servo system of claim 2 wherein said bipolar voltage source includes input means for receiving a power control signal which determines the voltage difference between the first and second voltages.

4. The servo system of claim 3 wherein said combining means includes an operational amplifier having a non-inverting input terminal connected to a variable voltage source to provide for setting the neutral position of the armature of said solenoid actuator means.

5. The servo system of claim 4 wherein said regulating means includes a pair of transistors connected in a complementary push-pull configuration, each having an emitter connected to said reference potential source, a collector connected to a separate one of the pair of output terminals of said bipolar voltage source and a base connected to the output terminal of the operational amplifier in said combining means.

6. Drive circuitry for a solenoid actuator having first and second coils, each having first and second ends, energization of the coils respectively exerting forces in opposite directions on armature means of the solenoid actuator, comprising:

a reference potential source;

means for connecting the first ends of the first and second coils to said reference potential source;

power supply means having first and second output terminals at which are produced voltages at a predetermined voltage difference suitable for energizing the solenoid actuator;

means for connecting the second ends of the first and second coils to the first and second output terminals respectively of said power supply means so that the voltage difference is impressed across the coils in series; and voltage control means for differentially controlling the voltages at the first and second output terminals of said power supply means relative to the reference potential in response to a position control signal supplied by input means in said voltage control means.

7. The drive circuitry of claim 6 wherein:

the input means in said voltage control means includes a signal summing point and position command input means for receiving a position command signal;

feedback signal means is connected to the solenoid armature means and is operable to produce a feedback signal dependent on the position of the armature means; and said feedback signal means is connected to the summing point, whereby the position command signal and the feedback signal are combined to produce the position control signal supplied by input means in said voltage control means.

8. The drive circuitry of claim 6 or 7 wherein the voltage difference between the first and second output terminals of said power supply means is variable in response to a power control signal supplied to input terminal means of the power supply means.

9. The drive circuitry of claim 8 wherein said voltage control means includes an operational amplifier having an inverting input terminal connected to the signal summing point of the input means in said voltage control means and a non-inverting input terminal connected to a variable voltage source to provide for setting the neutral position of the solenoid armature.

10. The drive circuitry of claim 9 wherein said voltage control means includes a pair of complementary series connected transistors, each having an emitter connected to said reference potential source and a collector connected to the second end of a separate one of the first and second coils and a base connected to the output terminal of the operational amplifier in said voltage control means.

* * * * *